Dec. 9, 1969  F. R. NEBIKER ET AL  3,482,783

EXPANDABLE NOZZLE

Filed Aug. 12, 1966

INVENTORS
ALBERT C. AEBISCHER,
FRED R. NEBIKER,
RICHARD E. KNIGHT

BY: *Oldham & Oldham*

ATTORNEYS

United States Patent Office 3,482,783
Patented Dec. 9, 1969

3,482,783
EXPANDABLE NOZZLE
Fred R. Nebiker, Akron, Albert C. Aebischer, Greensburg, and Richard E. Knight, Stow, Ohio, assignors to Goodyear Aerospace Corporation, Akron, Ohio, a corporation of Delaware
Filed Aug. 12, 1966, Ser. No. 572,090
Int. Cl. B64d *33/04;* B64c *15/06*
U.S. Cl. 239—265.15                                        7 Claims

ABSTRACT OF THE DISCLOSURE

This invention relates to an expandable nozzle, and more particularly to a nozzle which may be associated with a rocket motor to allow the pressurized hot gases of combustion to expand into a high area ratio nozzle thereby greatly increasing the efficiency of the rocket by allowing the gases to exhaust at a pressure as close as possible to the ambient pressure surrounding the rocket motor.

---

It is well known that the efficiency of nozzle operation can be greatly increased by utilizing high area ratio nozzles to allow exhaust gases to drop as close as possible to the ambient pressure outside the rocket. When a rocket is fired in the earth's atmosphere, particularly near sea level, the rocket nozzle does not have to be very large because the pressure drop to ambient pressure occurs very rapidly and efficiently in a short nozzle. However, when a rocket begins to operate in the upper atmosphere of the earth, or even in space, the pressure drop to the ambient pressure surrounding the rocket becomes much more difficult and therefore the nozzle must become much, much larger in size in order to still remain efficient. In fact, in order to produce peak efficiency in the vacuum of space, the rocket nozzle would have to be infinitely large. Of course, while attempts have been made to meet the optimum efficiency conditions available with a large or high area ratio nozzle, this must be limited by practical consideration of size and cost.

It is the general object of the invention, however, to provide for a greatly increased size in the discharge nozzle to achieve a high area ratio nozzle when the rocket is operating in a surrounding low ambient pressure area by making an expandable nozzle which may simply be pressurized when the rocket reaches the low ambient pressure region to greatly increase the size of the nozzle from its prelaunch condition without adding much to the weight of the rocket, nor presenting any structural problems with regard to the increased size of the nozzle.

A further object of the invention is to provide an inflatable rocket nozzle which may be easily and controllably inflated in a space or vacuum environment to greatly increase the area ratio of the discharge nozzle of a rocket.

A further object of the invention is to provide a simple attachment to conventional rocket nozzles which may greatly increase the area ratio thereof at very low cost, with high reliability, and with very simple mechanism.

The aforesaid objects of the invention and other objects which will become apparent as the description proceeds are achieved by providing in a rocket nozzle the combination of a rocket motor housing having a hot gas exhaust port, an expandable nozzle housing surrounding the gas port and comprising an inner fabric formed to the shape of a high area ratio nozzle, an outer fabric spaced from but substantially conforming to the shape of the inner fabric, drop yarns extending between and attached to each of the fabrics to hold the fabrics in a predetermined spaced relationship when they are moved apart, means fully surrounding the fabrics making the space enclosed thereby fluid tight, an ablative material covering the exposed surface of the inner fabric, and means carried within the rocket motor housing to controllably pressurize the fluid tight nozzle housing.

For a better understanding of the invention reference should be had to the accompanying drawings wherein.

To obtain increased rocket engine vacuum performance from high area-ratio exhaust nozzles, an extended surface area is required to integrate the relatively low pressures of the vacuum over the boundary area of a large volume of expanding gas. The optimum operational nozzle usually is considerably shorter than the perfect nozzle with completely axial exit gas flow, as a compromise is made between weight saving achieved by nozzle truncation and performance lost due to increased flow divergence at the exit. Because nozzle weight is the major parameter of interest, an expandable lightweight nozzle can greatly increase operational performance while still achieving important weight savings.

Figure 1:
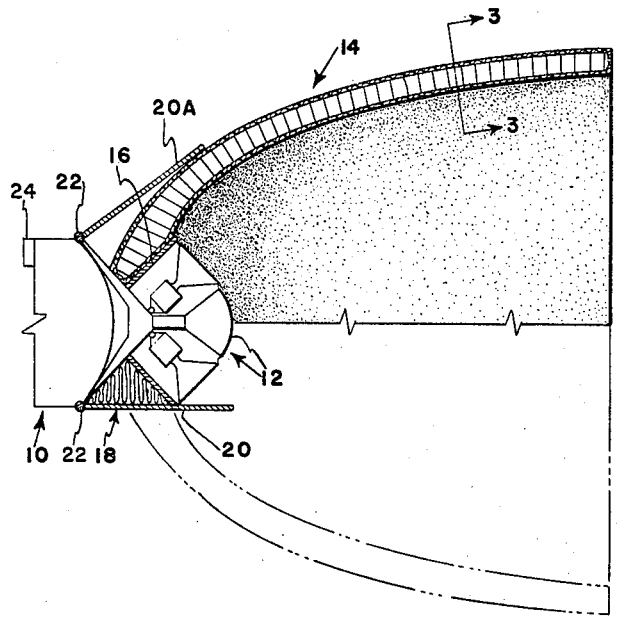
FIGURE 1 is a side elevation partially broken away and showing the preferred embodiment of the high area-ratio nozzle of the invention with one side illustrated as pressurized with the other side in its folded or launch configuration.
Figure 2:
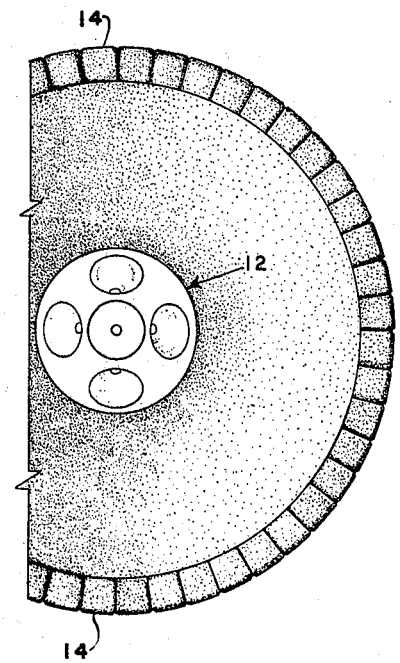
FIGURE 2 is a plan view of the nozzle of FIGURE 1 in the fully expanded condition.

With reference to the form of the invention illustrated in FIGURE 1 of the drawings, the numeral 10 indicates generally a rocket motor designed to exhaust hot gases of combustion through any one of a five nozzle cluster, indicated generally by numeral 12. While the center nozzle is mounted in fixed centrally and axially aligned relation to the rocket motor 10, the four outer nozzles are all gimbaled relative to the motor 10 so as to provide vector control as selectively desired in the usual manner. The multi-nozzle grouping 12 is a conventional configuration which has been used on many rocket motors heretofore.

The high area-ratio nozzle concept of the invention is achieved by providing an expandable high area-ratio nozzle, indicated as pressurized in the top portion of FIGURE 1 generally by numeral 14, mounted to a base ring 16, so as to substantially surround the nozzles 12, that is affixed to the rocket motor housing 10.

FIGURE 1 also clearly shows in the bottom portion thereof that when the expandable nozzle 14 is in the deflated condition, it folds down somewhat like an accordion to be stored around the base of the rocket motor housing 10, as indicated generally at numeral 18. The invention contemplates that a top plate 20 pivotally mounted at 22 to the rocket engine housing 10 may serve to hold the folded down nozzle 18 removably in position relative to the base ring 16 and the bottom end or base of the rocket motor housing 10, as clearly shown in the drawings. Naturally, when it is desired to inflate the nozzle 14, suitable pressure means 24 normally carried as a portion of the rocket motor housing 10 may be actuated to pressurize the rocket nozzle 14 into its expanded condition, indicated in the top portion of FIGURE 1. When the nozzle 14 is pressurized, the cover plate 20 pivots back out of its position indicated at 18 to a position 20A indicated in the top portion of FIGURE 1.

The invention contemplates that pressurization may be with an inert gas such as nitrogen, helium, or even air. Further, if desired for greater rigidity, a suitable foaming plastic can be utilized. Chemicals such as urethane resins and blowing agents can be blown into the cavity to expand and solidify. The density of the foam can be controlled to retain lightweight characteristics and provide the desired degree of stiffness. One further concept anticipates utilizing some of the actual liquid used to fire the rocket motor passed in a continuing cycle through the expandable nozzle to effect a cooling thereof from the hot gases of combustion, while at the same time providing pressurization. Naturally, in this concept, the amount of liquid fuel remaining in the nozzle to pressurize will not be burned, but the amount is so small as to have practically no effect on rocket performance.

It is anticipated that the preferred form for the expandable nozzle 14 would be to have an enlarged thick base with a thinner tip portion and gradual tapering from the thickened base to the thin tip portion to essentially provide greater rigidity to the pressurized nozzle. While in some instances on small nozzles, it may be acceptable to have the base and tip portions of substantially the same thickness, this generally is not preferable for rigidity purposes.

Figure 3:
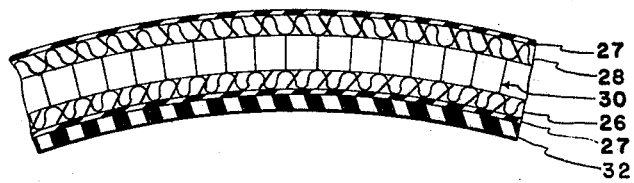
FIGURE 3 is a vertical cross sectional elevation of a section of the expandable nozzle of FIGURE 1 taken on line 3—3 thereof.

The invention contemplates that the actual formation of the nozzle 14 will be made from a dual wall thread connected inflatable fabric formed to the desired contour and controlled by the length of the drop threads, which fabric is made and sold by Goodyear Aerospace Corporation under the trade name "Airmat." Many patents on this material including those indicating how to control the contour and spacing and length of the drop threads are illustrated and described in U.S. Patents Nos. 3,216,460, 3,217,751, and 3,217,752. FIGURE 3 clearly illustrates the cross sectional relationship of the nozzle 14 as comprising an inner fabric layer 26 and an outer fabric layer 28 connected and held in spaced relationship when pressure is inserted between the two fabric layers by a plurality of drop yarns indicated generally by numeral 30. As pointed out in the above-identified patents, the length of the drop yarns 30 controls the contour between the inner and outer fabrics 26 and 28 so that the complex truncated curved shape with thickened base and thin tip illustrated by the nozzle 14 may easily be achieved. The invention contemplates that the fabrics 26 and 28 may be made from a suitable nylon or other synthetic fiber, or may in fact even be woven from metal yarns to add greater strength and durability to the final nozzle. However, in order to enhance the foldable characteristics of the nozzle, it is believed that synthetic fiber with great strength will be more practical.

One major problem encountered with a lightweight expandable nozzle of this type is to protect the inner fabric surface from the hot gases of combustion being exhausted from the rocket motor. To this end, the invention contemplates the use of an ablative liner 32 completely covering the inner fabric layer 26 over its entire surface. Any suitable high temperature rocket liner material which is flexible might appropriately be utilized. In the concept illustrated in FIGURE 3, the layer 32 is a butadiene rubber approximately ¼ inch thick which is adapted to char and ablate slowly as the hot gases of combustion impinge thereon, but that does act as a heat gradient to protect the inner fabric layer 26. A material such as "Gengard" made by the Aerojet General Corporation might suitably serve this purpose. The invention also contemplates that a rug-like ablative material such as "Teflon" could be simultaneously woven into the inner skin to serve the same purpose as the "Gengard" layer 32.

Of course, it should be understood that when the fabric layers 26 and 28 are formed and spaced by the drop yarns 30 that they are then made fluid impervious by closing the open ends and sides of the layers. This may be done, for example, by actually impregnating the layers if necessary with a suitable fluid impervious coating 27 so that the area between the fabric layers may be pressurized to space and maintain the fabric layers to their predetermined contour. The spacing is indicated in the inflated or pressurized configuration shown in FIGURE 1.

One important feature in the pressurization is to be sure that all components which will rub or have relative movement to each other are provided with a friction resisting coating to facilitate sliding of the parts relative to each other upon the pressurization. This, for example, would include the material forming the nozzle itself, as well as the storage housing, as shown in the top half of FIGURE 1 of the drawings.

Figure 4:
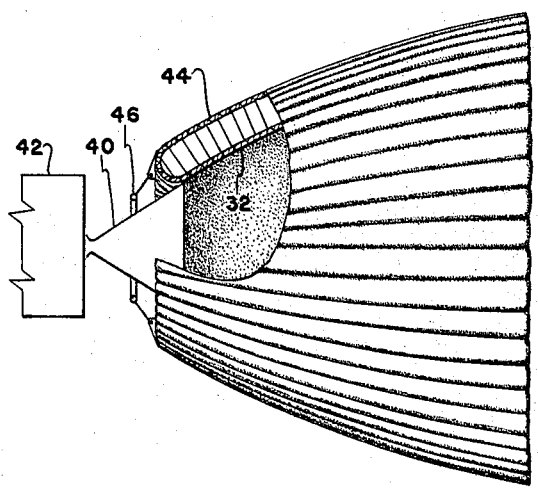
FIGURE 4 is a plan view of a pressurized nozzle mounted to a single fixed nozzle exhaust.

FIGURE 4 illustrates the use of the dual wall thread connected inflatable fabric for a high area-ratio expandable nozzle for a single fixed exhaust nozzle. More specifically, a small fixed exhaust nozzle 40 is mounted to receive the hot gases of combustion from a rocket motor housing 42. The efficiency of the nozzle 40 is greatly increased by providing an inflatable nozzle extension 44 anchored to a base ring 46 mounted thereto. It should be noted that the contour of the extension 44 exactly conforms in inner contour with the nozzle 40 so as to provide a smooth and laminar flow of the hot gases of combustion therefrom. As explained above, the nozzle 44 acts to provide a high area-ratio for the expanding gases making the exhaust gases approach as nearly as possible to the ambient pressure surrounding the rocket. This provides better burning characteristics, and greater efficiency.

One other feature of the rocket construction shown in FIGURES 1 and 4 of the drawings is to provide an impact attenuation or shock absorbing device if the rocket nozzle is used as a retro or slowing device to facilitate landing, for example on the moon, or in a rendezvous with another spacecraft. If, perhaps, calculations are not exact and the nozzle impacts with the moon's surface or with the other spacecraft, there will be relatively little if any damage because of the inflated and pressurized characteristics of the nozzle, making it a cushion type shock absorber or impact attenuation device.

Thus, it is seen that the objects of the invention have been achieved by providing an expandable nozzle to greatly increase the area-ratio in nozzle operation without adding undue weight and structural requirements. The increase in nozzle area-ratio greatly increases nozzle efficiency and burning characteristics. The pressurization can be easily controlled within the nozzle itself, and may not take place until the rocket has entered into a space type environment where a high area-ratio nozzle becomes extremely important and critical to insure maximum efficiency. The nozzle is stored in a collapsed accordion-like condition until it is pressurized to form its predetermined shape.

What is claimed is:

1. In an inflatable rocket nozzle the combination of:
   a rocket motor housing having a hot gas exhaust port,
   an expandable nozzle housing comprising:
      an inner fabric formed to the shape of a high area-ratio nozzle,
      an outer fabric spaced from but substantially conforming to the shape of the inner fabric,
      drop yarns extending between and attached to each of the fabrics to hold the fabrics in a predetermined spaced relationship when they are moved apart, and
      means fully surrounding the fabrics making the space enclosed thereby fluid tight,
   an ablative material covering the exposed surface of the inner fabric, and
   means carried within the rocket motor housing to pressurize the nozzle housing controllably.

2. A rocket nozzle according to claim 1 which includes a framework compartment affixed to the rocket motor housing and surrounding the exhaust port, said compartment receiving and storing the nozzle housing in an accordion type folded condition when it is depressurized.

3. A rocket nozzle according to claim 2 where the inside of the compartment and any portions of the nozzle housing in contact therewith or with itself are covered with a friction resistant material.

4. A rocket nozzle according to claim 1 where the base of the nozzle housing has a greater spaced distance between the fabrics than at the tip of the nozzle housing, with a gradual taper of the spaced distance between the fabrics from the base to the tip of the nozzle housing.

5. A rocket nozzle according to claim 1 where an inert gas is used for pressurization of the nozzle housing.

6. A rocket nozzle according to claim 1 where a foam means is utilized to pressurize and rigidize the nozzle housing.

7. In combination:
a rocket motor housing having a hot gas exhaust port,
a flexible and inflatable fabric nozzle surrounding the exhaust port and secured to the motor housing, and
an ablative material covering the inner surface of the nozzle.

References Cited

UNITED STATES PATENTS

| 2,737,019 | 3/1956 | Billman | 239—265.43 |
| 3,053,488 | 9/1962 | Cox | 239—265.43 |
| 3,249,306 | 5/1966 | Altseimer | 239—265.43 |
| 3,279,192 | 10/1966 | Hull et al. | 239—265.43 |
| 3,346,186 | 10/1967 | Fulton et al. | 239—265.43 |

EVERETT W. KIRBY, Primary Examiner

U.S. Cl. X.R.

60—271; 239—265.19, 265.33, 265.43